United States Patent
Li et al.

(10) Patent No.: US 8,615,602 B2
(45) Date of Patent: Dec. 24, 2013

(54) METHOD AND DEVICE FOR RECORDING OR PLAYING BACK A DATA STREAM

(75) Inventors: Hui Li, Hannover (DE); Meinolf Blawat, Hannover (DE); Wolfgang Klausberger, Hannover (DE); Stefan Kubsch, Hohnhorst (DE); Dietmar Hepper, Hannover (DE)

(73) Assignee: Thomson Licensing, Boulogne, Billancourt (FR)

( * ) Notice: Subject to any disclaimer, the term of this patent is extended or adjusted under 35 U.S.C. 154(b) by 1494 days.

(21) Appl. No.: 11/587,473

(22) PCT Filed: Apr. 22, 2005

(86) PCT No.: PCT/EP2005/004377
§ 371 (c)(1),
(2), (4) Date: Oct. 25, 2006

(87) PCT Pub. No.: WO2005/104127
PCT Pub. Date: Nov. 3, 2005

(65) Prior Publication Data
US 2007/0226313 A1 Sep. 27, 2007

(30) Foreign Application Priority Data
Apr. 27, 2004 (EP) .................................... 04009912

(51) Int. Cl.
G06F 15/173 (2006.01)
H04N 9/80 (2006.01)
G06F 17/30 (2006.01)

(52) U.S. Cl.
USPC ............................. 709/238; 386/239; 707/823

(58) Field of Classification Search
USPC .......... 709/238; 707/823, 102, 104, 821, 822, 707/827; 386/265, 239
See application file for complete search history.

(56) References Cited

U.S. PATENT DOCUMENTS

| 6,499,083 B1 * | 12/2002 | Hamlin | 711/112 |
| 2003/0115219 A1 * | 6/2003 | Chadwick | 707/200 |

FOREIGN PATENT DOCUMENTS

| GB | 2371889 | 8/2002 |
| JP | 11175377 | 2/1999 |
| JP | 2000099375 | 4/2000 |
| JP | 2002351705 | 12/2002 |

OTHER PUBLICATIONS

Society of Motion Picture and Television Engineers, SMPTE Standard for Television—Material Exchange Format (MXF)—File Format Specification (Standard), Jun. 12, 2004, Sociiety of Motion Picture and Television Engineers 595 W, Hartsdale Ave., White Plains, NY 10607, SMPTE 377M-2004.*
SMPTE: "Material Exchange Format (MXF)" Proposed SMPTE Engineering Guideline, vol. EG41, Jul. 22, 2003, pp. 1-74.
Search Report Dated Jul. 22, 2005.
Ito, D. et al., "Online Cluster Reconfiguration of Autonomous Disks", Joho Shori Gakkai Kenkyu Hokoku, JP, vol. 2001, No. 70, Jan. 1, 2001, pp. 119-126.
Ito, D. et al., "Automatic Reconfiguration of an Autonomous Disk Cluster", Pacific Rim International Symposium on Dependable Computing, IEEE Computer Society, Seoul, Korea, Dec. 17, 2001, pp. 1-18.

* cited by examiner

Primary Examiner — Nicholas Jensen
(74) Attorney, Agent, or Firm — Jeffrey D. Carter

(57) ABSTRACT

A distributed storage system able to support real-time recording of streaming data shall be provided. Therefore, on the basis of Material Exchange Format (MXF) formatted files a data stream is packed into at least a first MXF formatted file and a second formatted MXF file. First connection data are inserted into the first MXF formatted file, wherein this first connection data points to the second MXF formatted file. Furthermore, second connection data are inserted into the second MXF formatted file, wherein the second connection data points to the first MXF formatted file. These connection data inserted as metadata into the MXF formatted files enable both seamless real-time stream recording and stream-able data playback.

13 Claims, 10 Drawing Sheets

| Task | Attribute | Reference |
|---|---|---|

Fig. 3

METHOD AND DEVICE FOR RECORDING OR PLAYING BACK A DATA STREAM

This application claims the benefit, under 35 U.S.C. §365 of International Application PCT/EP05/004377, filed Apr. 22, 2005, which was published in accordance with PCT Article 21(2) on Nov. 3, 2005 in English and which claims the benefit of European patent application No. 04009912.9, filed Apr. 27, 2004.

TECHNICAL FIELD

The present invention relates to a method or a device for recording a data stream on a distributed storage system. Furthermore, the present invention relates to a method or device for playing back such a data stream recorded on a distributed storage system.

BACKGROUND

Based on the peer-to-peer (P2P) technology, a distributed storage system can make use of all storage capacity of connected peers, i.e. nodes, to store data, such as duplicating important data in different peers, or splitting large-size data and sharing or storing them in different peers.

The present document relates to the specific Material Exchange Format (MXF). MXF is an open file format targeted at the interchange of audio-visual material with associated data and metadata. It has been designed and implemented with the aim of improving file based interoperability between servers, workstations and other content creating devices.

Basic MXF Structure

Figure 1:
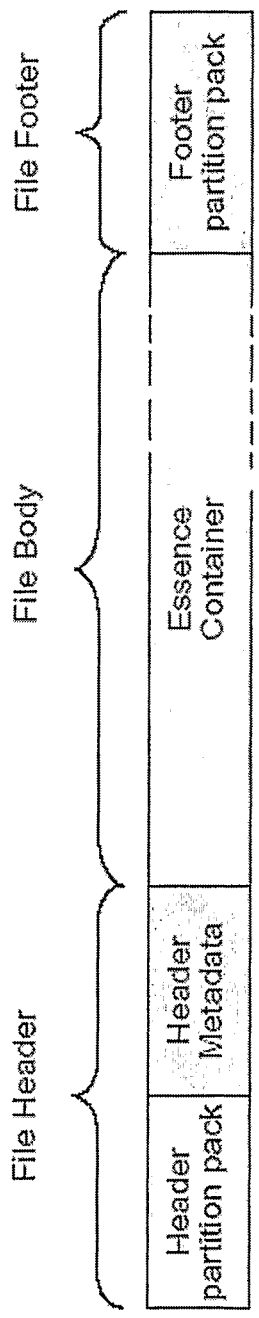

As shown in FIG. 1 taken form the MXF standard specification, the MXF Format consists of a File Header, a File Body and a File Footer.

The File Header contains Header Metadata, which provides information about the file as a whole, including labels for the early determination of decoder compliance.

Figure 2:
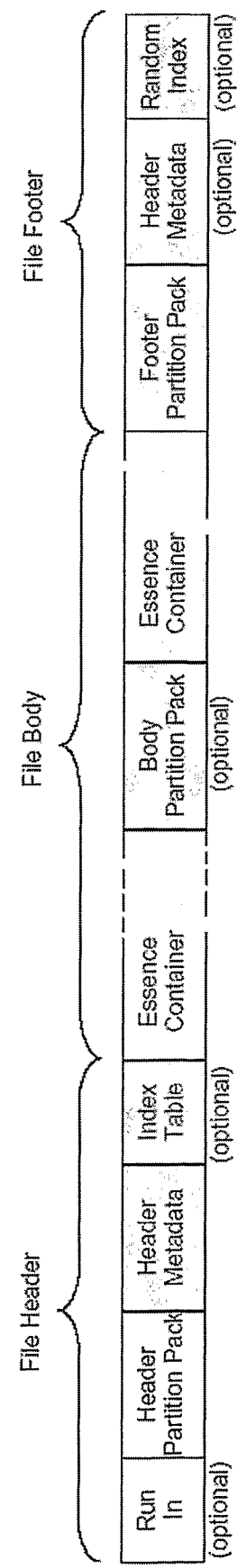

The File Body comprises picture, sound and data essence stored in Essence Containers. Essence Containers from different tracks may be interleaved or separated as shown in FIG. 2. Body Partition Packs of File Body may optionally contain repetition of Header Metadata.

The File Footer terminates the file and may optionally contain Header Metadata. The File Footer may further include some information not available at the time of writing the File Header (such as the duration of the file). In certain specialized cases, the File Footer may be omitted.

The File Header is designed to be small enough that it can easily be isolated and sent to a microprocessor for parsing. The bulk of the file will usually be the File Body—this is the picture, sound and data essence. The File Footer provides capacity to put the Header Metadata at the end of the file. The reason is: in certain applications, such as recording a stream to an MXF file, there will be Header Metadata values that will not be known until the recording is finished. The File Footer provides a mechanism for doing this. It also provides clear indication that the file has terminated.

The basic MXF structure supports embedded metadata throughout the MXF file.

MXF Interoperation with Stream Interfaces

MXF files will often be processed in streaming environments. This will include streaming to and from videotapes and data tapes, and transmission over unidirectional links or links with a narrow-band return-channel.

Sequential writing is necessary when the source or the link or the destination operates only in streaming mode. Random access writing is permissible before or after data transfer, for example, to optimize downstream access performance.

MXF's Operational Patterns have a special qualifier bit that indicates that the file has been created for streaming.

MXF files may be directly created from standardized formats such as MPEG2 systems and elementary streams, AES3 data streams (Audio Engineering Society Standard) and Digital Video (DV) DIF packet streams. These formats may be mapped from one of several real-time interfaces such as SMPTE 259M (Serial Digital Interface, SDI), SMPTE 305M (Serial Digital Transport Interface, SDTI), SMPTE 292M (High-Definition Serial Digital Interface, HD-SDI), or transport interfaces with real-time protocols such as IEEE-1394, ATM, IEEE802 (ethernet), ANSI Fibre Channel and so on.

When a streaming file is captured, a File Header is created and the essence is KLV (Key Length Value) wrapped on the fly. The data rate increases due to the KLV wrapping and addition of headers. Real time streaming devices must ensure that any buffering requirements of a streaming interface are catered for with this change of data rate.

The basic MXF structure supports stream recording and playback.

File Splitting Requirement of a Distributed Storage System

The behaviour of a distributed storage home network system will in the future probably be characterized by a convenient automatically "storekeeping" of all kind of data. The user will not know in any case where the content is stored. So this kind of distributed storage system can be seen as a monolithic storage block and the system has to look by its own for a storage device that matches capacity of free storage without any administrative effort by the user, and with a transparent behaviour for the requiring application.

The distributed storage system has to deal with different lengths of application packets coming along with the streaming data of different standards (e.g. MPEG-2, DV, etc.). When streaming data has to be handled by the distributed storage system, it is not generally possible to get the size of the data in advance. So seamless real-time splitting of data could be necessary when the maximum capacity of a peer, or node, will be reached. This invention proposes methods for the processing of streaming data in the distributed storage environment for the record and playback condition.

INVENTION

It is the object of the present invention to provide a distributed storage system which is able to support real-time recording of streaming data.

According to the present invention this object is solved by a method for recording a data stream on a distributed storage system by packing said data stream into at least a first MXF file and a second MXF file, inserting first connection data into said first MXF file, said first connection data pointing to said second MXF file, and inserting second connection data into said second MXF file, said second connection data pointing to said first MXF file.

Furthermore, there is provided a corresponding device for recording a data stream on a distributed storage system including packing means for packing said data stream into at least a first MXF file and a second MXF file, data processing means for inserting first connection data into said first MXF file, said first connection data pointing to said second MXF file, and for inserting second connection data into said second MXF file, said second connection data pointing to said first MXF file.

Simultaneously, there is provided a method for playing back a data stream recorded on a distributed storage system by reading connection data from a first MXF file, said connection data pointing to a second MXF file, building an MXF file chain on the basis of said connection data and playing back the essence data of said first MXF file and said second MXF file according to said MXF file chain.

Moreover, there is provided a corresponding device for playing back a data stream recorded on a distributed storage system including reading means for reading connection data from a first MXF file, said connection data pointing to a second MXF file, data processing means for building a MXF file chain on the basis of said connection data and playing means for playing back the essence data of said first MXF file and said second MXF file according to said MXF file chain.

The advantage of such methods and devices is, that while stream recording, if a peer reaches its storage-capacity, the input stream may be rerouted to another peer or other peers, in order to record the input stream continuously. The file splitting can be performed in real-time. Consequently, the present invention enables such seamless real-time stream recording and stream-able data play back for MXF files.

Preferably, the inventive method of recording a data stream further includes the step of inserting third connection data into said second MXF file, wherein said third connection data pointing to a third MXF file. Thus, a current MXF file points to the last MXF file and to the next MXF file.

The step or steps of inserting connection data into the MXF file may be performed while terminating said recording of an MXF file. At that moment the last MXF file and the next MXF file are available, or known respectively.

While recording, the data stream may be split into a specific number of MXF files, wherein the specific number is not known in advance, and connection data pointing to all of these MXF files may be stored in each of said specific number of MXF files. This enables to obtain the complete MXF file chain by reading only one MXF file.

The connection data may be inserted as metadata into the header and/or the footer of an MXF file. If the connection data are stored both in the header and the footer, the MXF file can be split later without problems.

When MXF files are in Open Status, in order to built up the MXF file chain the step of reading connection data may be repeated for each MXF file of said MXF file chain. Thus, the MXF file chain can be built up step by step.

When MXF files are in Closed Status, i.e. finished, the step of reading connection data needs to be performed only once for one MXF file chain, wherein connection data pointing to all MXF files of said MXF file chain are included in each of said MXF files of said MXF file chain. In this case it is only necessary to read any one of the MXF files in order to obtain the complete MXF file chain.

Preferably, the connection data include task data, attribute data and reference data. The task data contains a task ID value, the attribute data contains a status value like "next" (for a following MXF file) or "last" (for a preceding MXF file) and the reference value contains an ID value, e.g. UUID, of the other MXF file. By inserting these three different data as connection metadata into the MXF header, it is possible to realize seamless real-time stream splitting for recording and play back.

DRAWINGS

Figure 4:
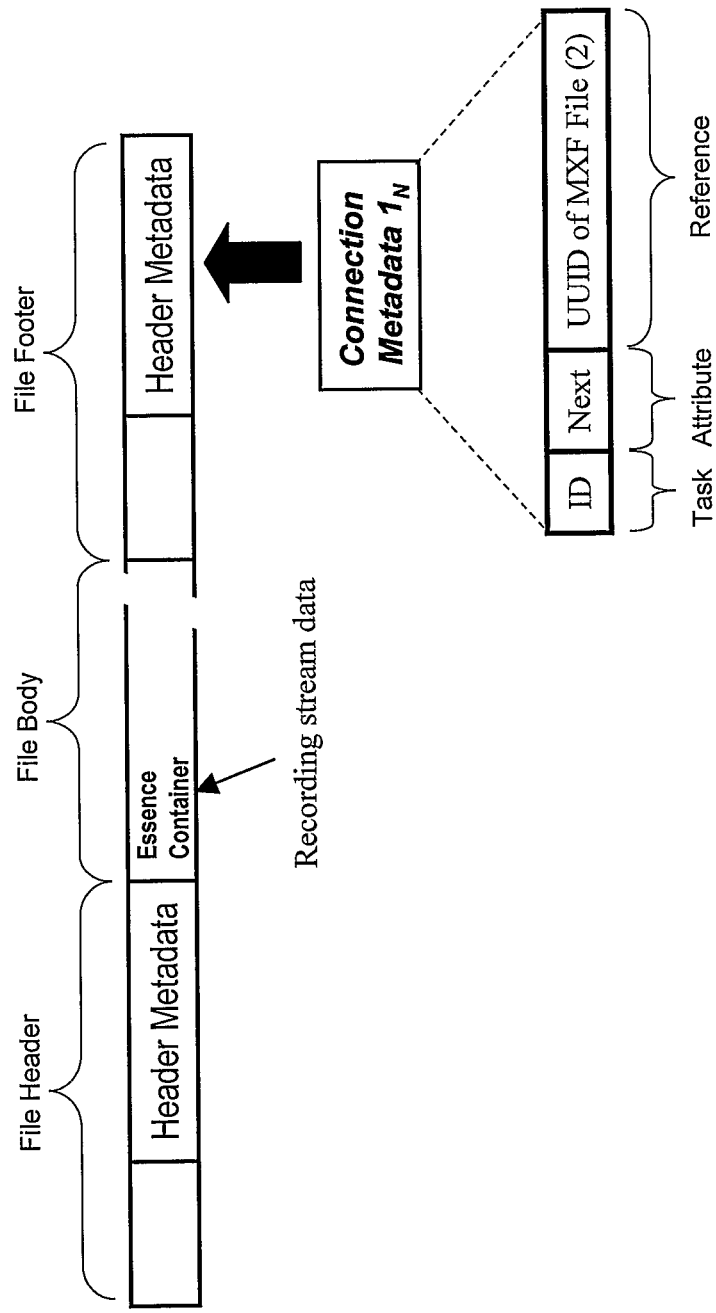
Figure 5:
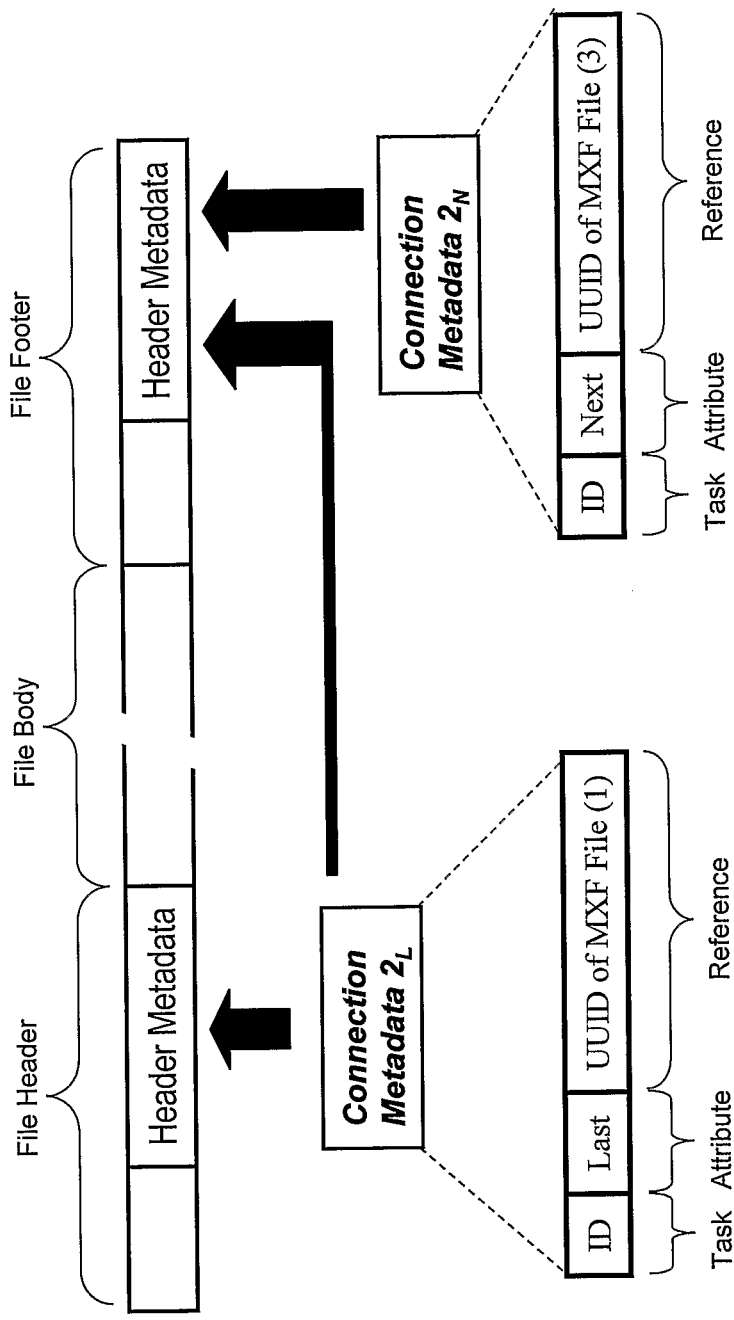
Figure 6:
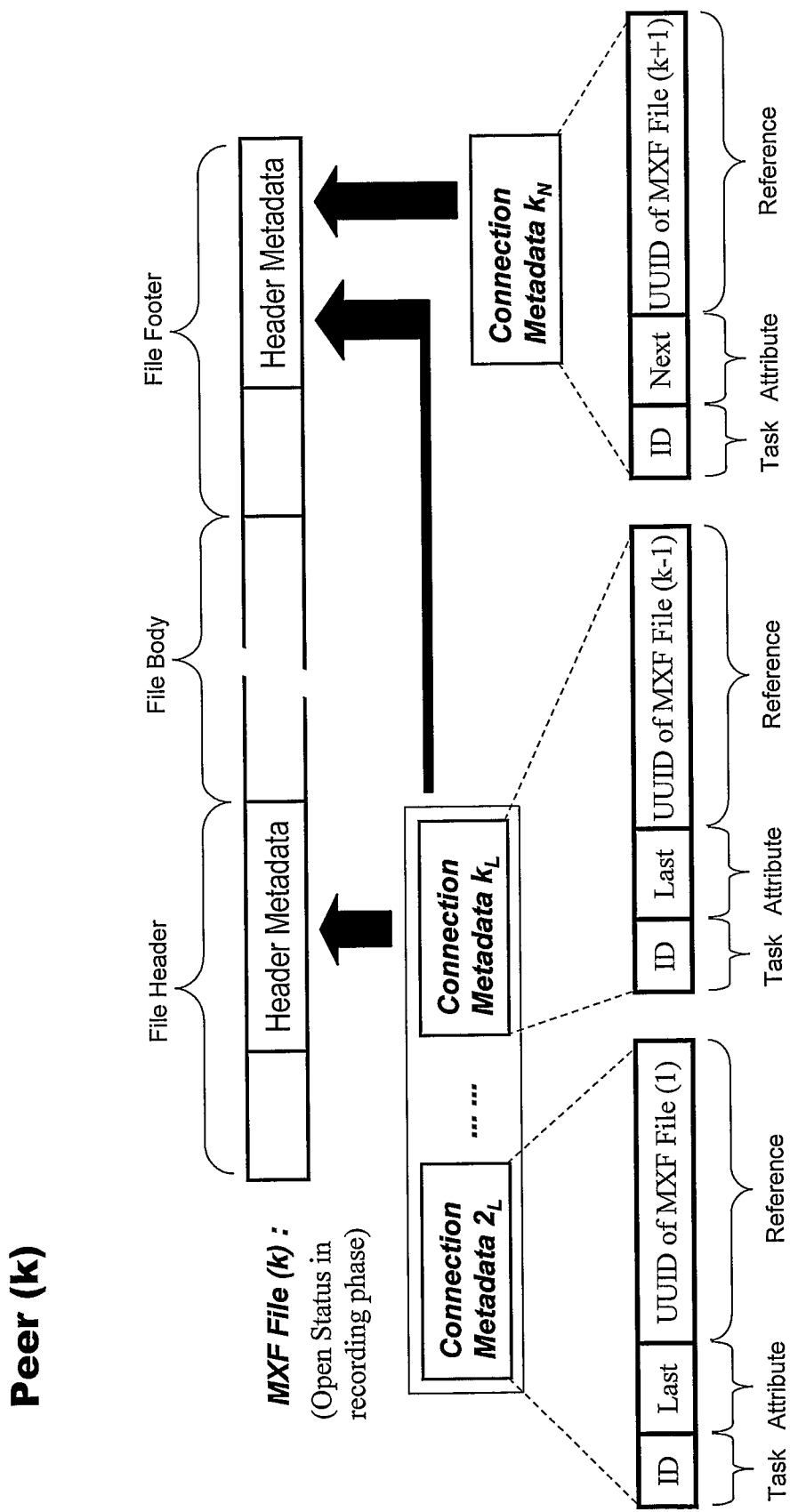
Figure 7:
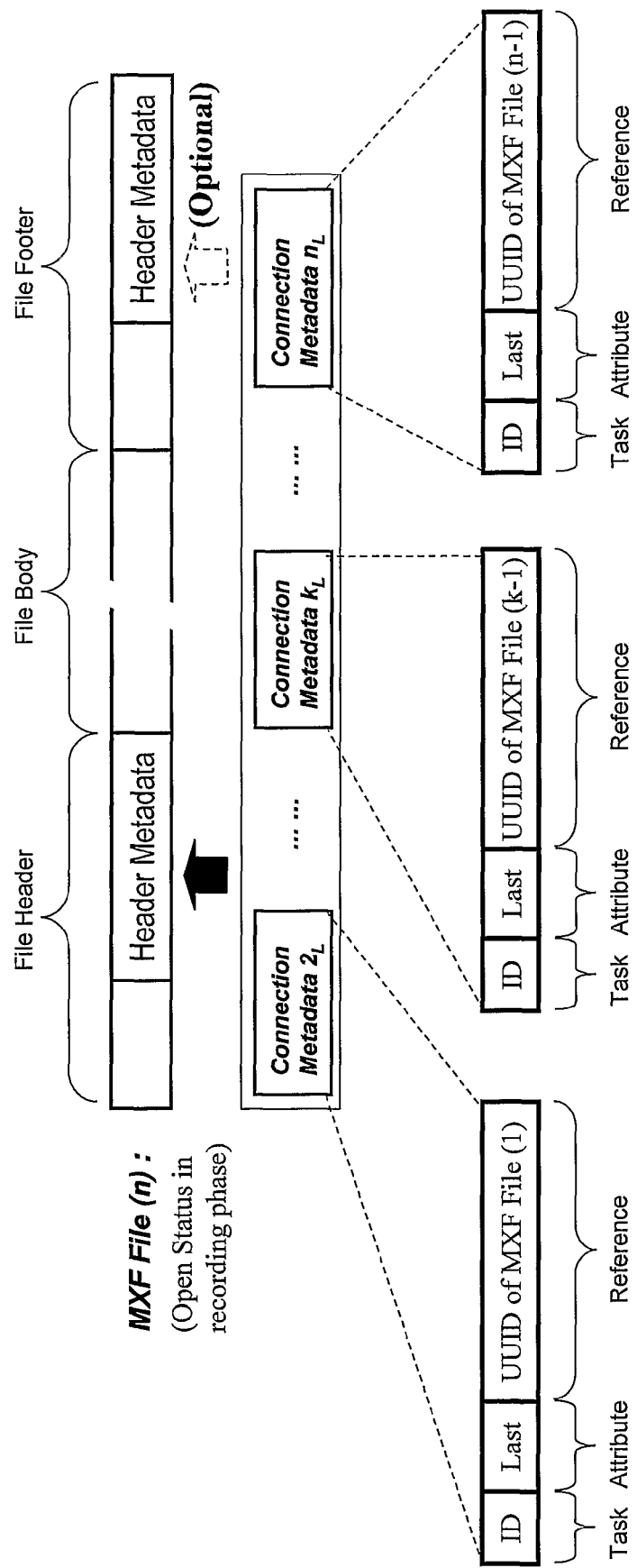
Figure 8:
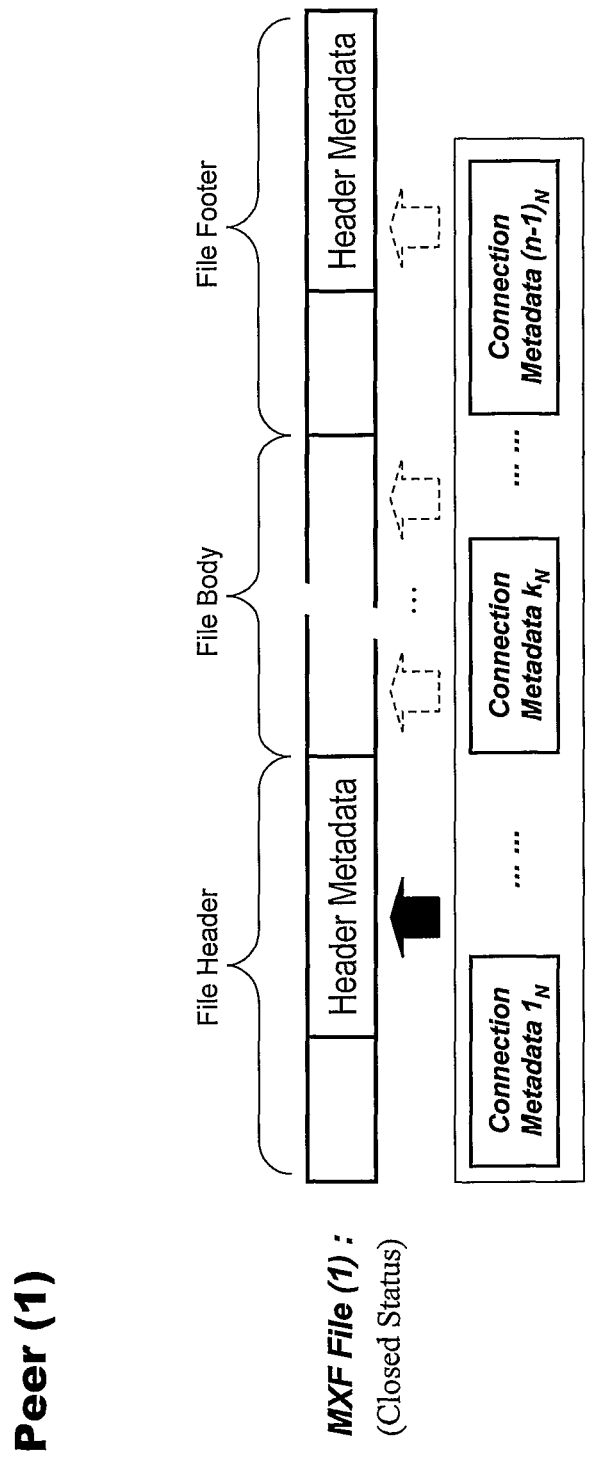
Figure 9:
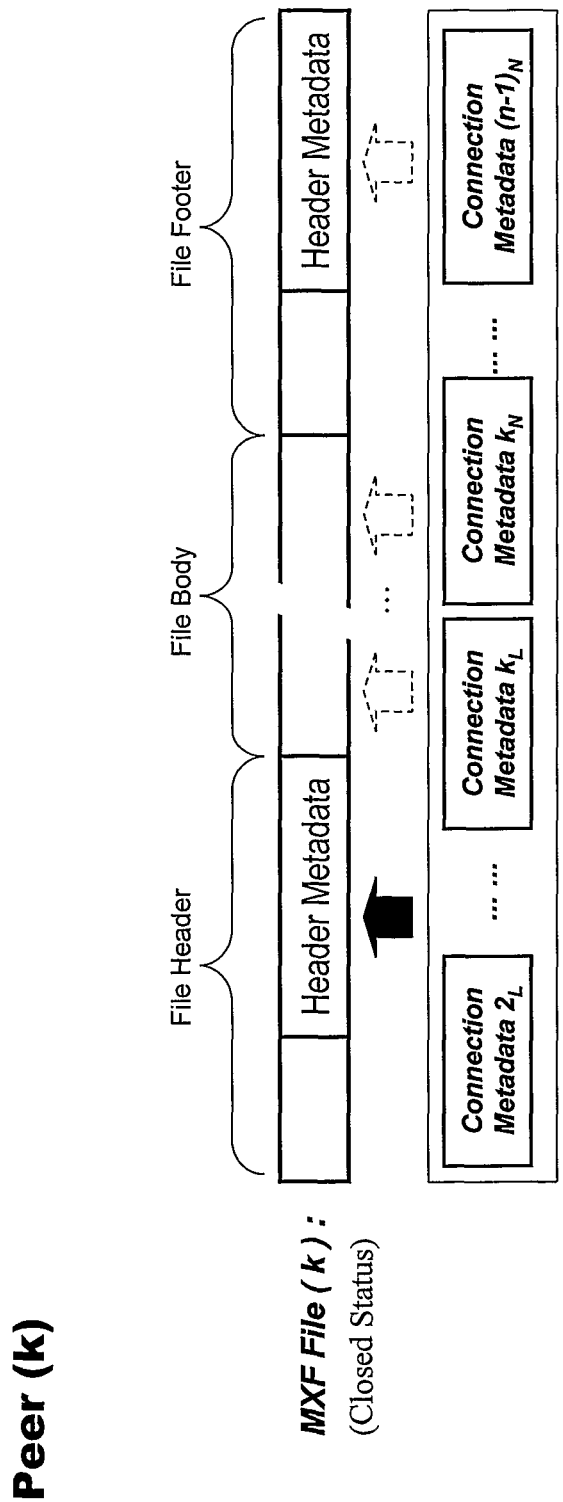
Figure 10:
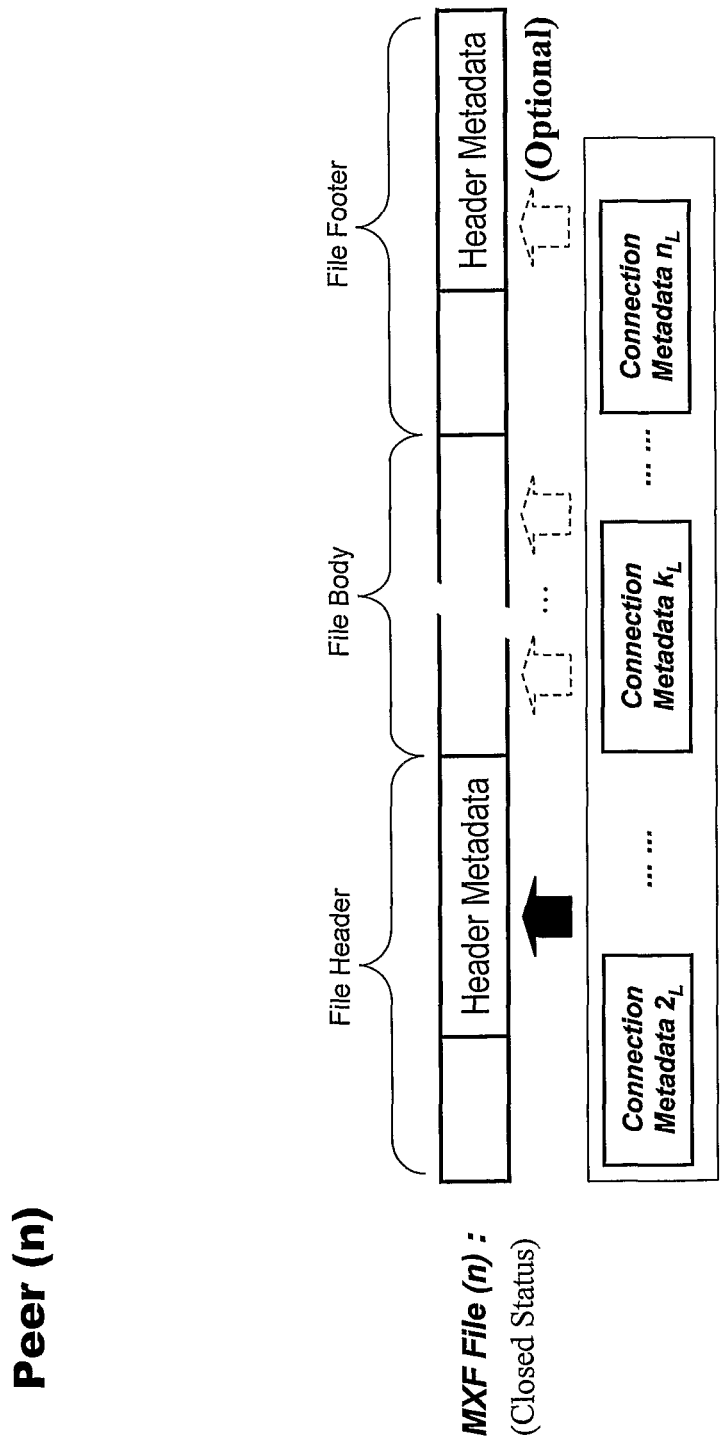
Figure 11:
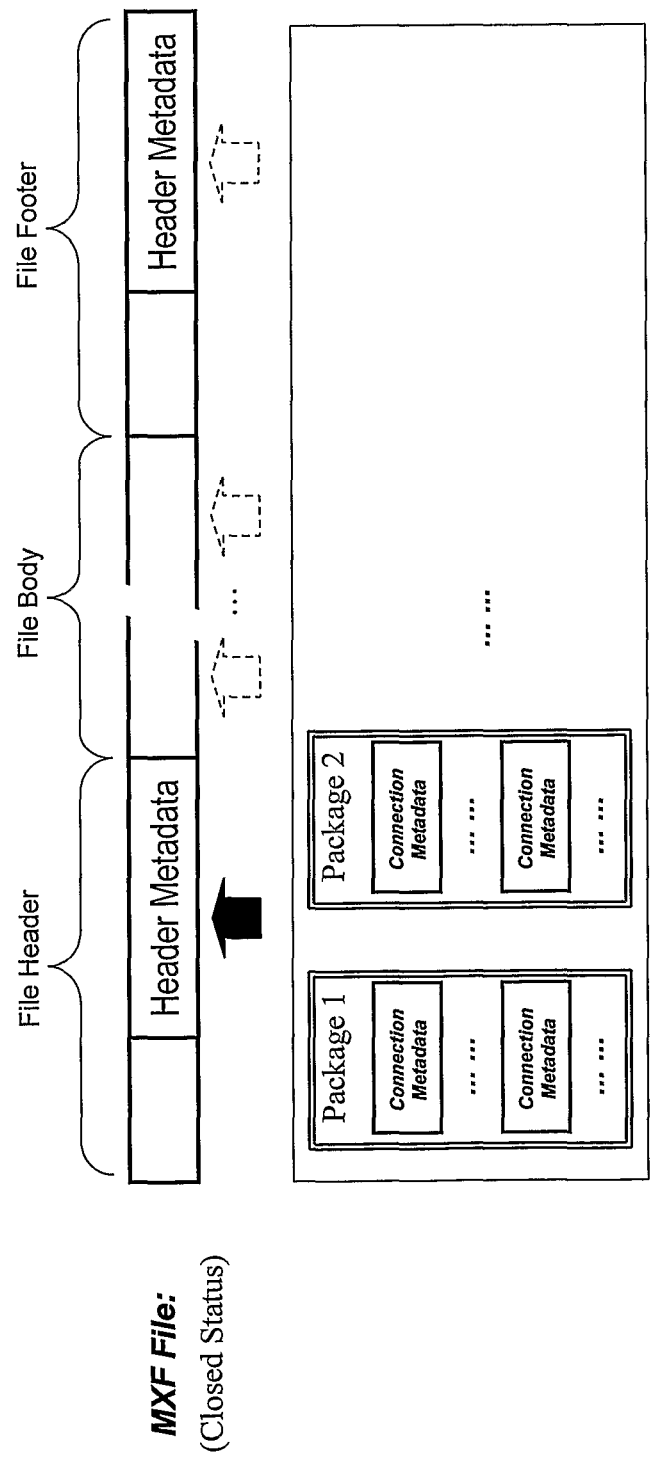

The present invention will now be described in more detail in connection with the attached drawings showing in:

FIG. 1 an overall data structure of a simple MXF file according to the standard;

FIG. 2 an overall data structure of an MXF file with some optional components;

Figure 3:
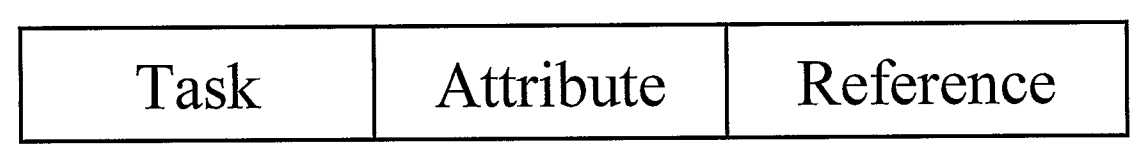

FIG. 3 a scheme of splitting a metadata according to the present invention;

FIG. 4 the insertion of connection metadata to an MXF file 1 after stream recording on a peer 1 of a distributed storage system;

FIG. 5 the insertion of connection metadata to an MXF file 2 before and after stream recording on a peer 2 of the distributed storage system;

FIG. 6 the insertion of connection metadata to an MXF file k before and after stream recording on a peer k [k=2, 3, . . . (n−1)] of the distributed storage systems;

FIG. 7 the insertion of connection metadata to an MXF file n before and after stream recording on a peer n;

FIG. 8 the connection metadata of the MXF file 1 in a closed and completed status;

FIG. 9 the connection metadata in the MXF file k in the closed and completed status;

FIG. 10 the connection metadata in the MXF file n in the closed and completed status; and FIG. 11 connection metadata packages in an MXF file.

EXEMPLARY EMBODIMENTS

In the following, preferred embodiments of the present invention are described in more detail.

Setting Up Special "Connection Metadata" into MXF File

In order to realize real-time file splitting for stream recording and playback, a special "Connection Metadata" is created. This Connection Metadata is inserted in the Header Metadata of the MXF file. The Header Metadata may be located in the File Header, the File Body and/or the File Footer.

As shown in FIG. 3, a Connection Metadata according to the present embodiment consists of at least three parts: Task, Attribute and Reference. These parts may e.g. be fields.

The Task field contains a task ID value. For example, each stream recording action has an own task ID. The Attribute field value can represent at least two statuses: "next" and "last". The "next" attribute means that the current MXF file is followed by a subsequent MXF file, because of the split stream recording. The subsequent MXF file can be found by the UUID (Universal Unique Identifier) included in the Reference field. The "last" attribute means that the current file follows a preceding MXF file and is a part of a split stream. The preceding MXF file can be found by the UUID included in the Reference field.

For representing different kinds of splitting scenarios of stream recording, a Header Metadata may contain multiple Connection Metadata. The Connection Metadata may be firstly generated by both the MXF File Header and the File Footer.

In the following, application scenarios of the Connection Metadata are pointed out in detail.

Recording a Stream into a Sequence of MXF Files by Using Connection Metadata

To handle concatenated stream objects in a distributed storage system, all associated MXF files will be labeled by a UUID, and the complete sequence of connected streamable objects (MXF files) can be generated with the help of Connection Metadata embedded in each of the MXF files.

One requirement of the distributed storage system is the self-organizing of all functions that are not significant for the user. For these tasks (e.g. file splitting when the capacity of one node is achieved), a self-controlled exchange of control messages between the nodes is necessary.

In the distributed storage system an input stream shall be real-time recorded continuously into n MXF files of n peers. Connection Metadata in all these MXF files have the same task ID value. Every peer communicates with each other through control metadata designed by the distributed storage system. The recording procedure is described in detail in the following (compare FIG. 4 to 8):

1. At first, the input stream is packed into MXF file (1) in peer (1) of the distributed storage system.
2. Before peer (1) reaches its maximum storage capacity, peer (1) should send a Control Message to other peers to ask if any peer can continue to record the stream.
3. If peer (2) replies that it can continue to record the stream, peer (1) will tell the receiving device of the input stream to prepare for rerouting the incoming stream to peer (2). Peer (2) will be noticed to prepare for recording the input stream.
4. As shown in FIG. 4, while terminating the current stream recording, peer (1) generates a new Connection Metadata ($1_N$) and inserts it into the Header Metadata in the File Footer of the current MXF file (1). In this case, the File Footer of MXF file (1) must include Header Metadata, though usually the Header Metadata in MXF File Footer is optional. The current stream recording task ID is set as the Task value of the Connection Metadata ($1_N$). The Attribute value of the Connection Metadata ($1_N$) is set to be "next", and the Reference contains the UUID of MXF file (2) in peer (2), which records the following stream.
5. As shown in FIG. 5, when peer (2) starts to record the incoming stream, at first it generates the File Header of the MXF file (2) and inserts a Connection Metadata ($2_L$) in the Header Metadata of the File Header. The value of the Attribute of the Connection Metadata ($2_L$) is "last" and the UUID of MXF file (1) is put in its Reference.
6. If peer (2) will reach its maximum storage capacity, the same action as described in steps 2 to 4 are repeated. The input stream will be rerouted to another peer after terminating the recording task in peer (2), a Connection Metadata ($2_N$) will be inserted in the Header Metadata of the File Footer of peer (2). The Attribute of Connection Metadata ($2_N$) is "next" and its Reference includes the UUID of the next MXF file (3), see FIG. 5.
7. Further peers (k) may repeat steps 5 and 6 until the whole stream recording processing is finished with MXF file (n) of peer (n), wherein k=2, 3, . . . , n-1. As shown in FIG. 6, in the Header Metadata of the File Header, all previous "last" Connection Metadata (($2_L$) . . . ($k_L$)) are accumulated and inserted into the Header Metadata according to the natural order of created MXF files. This structure enables each MXF file (k) to know all its prior concatenated MXF files.
8. When the whole stream recording processing will be finished in peer (n), as shown in FIG. 7, the MXF file (n) generates a Header Metadata in the File Header, which accumulates all "last" Connection Metadata (($2_L$) . . . ($n_L$)), and arranges them in their natural order. Before terminating the whole stream recording task, the same sequence of Connection Metadata (($2_L$) . . . ($n_L$)) may be optionally repeated in the Header Metadata of the File Footer of the MXF file (n).

According to the above described stream recording processing, the input stream is recorded into a sequence of MXF files (1, 2, . . . n). These real-time generated "last" and "next" Connection Metadata in the Header Metadata of the File Header or the File Footer provides enough messages for playing back the sequence of MXF files.

Finalizing Connection Metadata in Closed MXF File

However, it must be kept in mind that these n MXF files generated from the input stream according to the above procedure are still in an "Open" status. According to the MXF standard specification, MXF files shall be closed before playback. Therefore, a finalizing process is necessary to make the Connection Metadata partitions in the Header Metadata of the above MXF files to be "Closed". All associated peers may send control metadata to each other to search and collect the Connection Metadata messages in these concatenated MXF files. The Connection Metadata in "Closed" MXF files may be described as following (compare FIG. 8 to 10):

1. As shown in FIG. 8, after the finalizing-process, Header Metadata of the first MXF file (1) contains no "last", but all "next" Connection Metadata (($1_N$) . . . (($n-1)_N$)), as indicated by the index "N". The Header Metadata may optionally be repeated in the File Footer and the Body Partitions of the File Body as indicated by dashed arrows in FIG. 8.
2. As shown in FIG. 9, after the finalizing-process, the Header Metadata of any following MXF file (k) contains all "last" Connection Metadata (($2_L$) . . . ($k_L$)) created before the current MXF file (k), including that of the current file, and all "next" Connection Metadata (($k_N$) . . . (($n-1)_N$)) created after the current MXF file (k), including that of the current file.
3. As shown in FIG. 10, after the finalizing-process, the Header Metadata of the end MXF file (n) contains all "last" Connection Metadata (($2_L$) . . . ($n_L$)) created in the sequence of MXF files. Like in MXF file (1) the Header Metadata in all MXF files (k) and (n) may optionally be repeated in the File Footer and the Body Partitions of the File Body as indicated by dashed arrows in FIG. 10.

Concatenated MXF Files Playback by Using Connection Metadata

MXF features enable stream-able playback of its essence in the MXF Essence Container.

By using control metadata that are designed and generated by the distributed storage system, it is possible to set up stream-able playback among a group of peers.

Playback of Open MXF Files

Although MXF decoders are not required to be able to decode Open MXF files, it shall be assumed herein to be possible to playback these concatenated Open MXF files with Connected Metadata. As shown in FIG. 4-7, usually these embedded Connection Metadata in each MXF file provide reference to all prior concatenated MXF files and only the next MXF file. For playback of these MXF files, it may be started from any MXF file of any peer (1, 2, . . . , n) to set up the playback task. At first, all UUIDs of all prior MXF files can be extracted from these accumulated "last" Connection Metadata in the Header Metadata from the File Header or the File Footer of each MXF file, except MXF file (1), which has no "last" Connection Metadata. Then, the "next" Connection Metadata in the File Footer of the current MXF file is parsed to find its next reference MXF file. The "next" Connection Metadata in the File Footer of each next MXF file is parsed one by one. Afterwards, a playback task is arranged by using control metadata among related peers.

Playback of Closed MXF Files

As shown in FIG. 8 to 10, in closed MXF files, each MXF file contains compact Connection Metadata, which link to all other concatenated MXF files. In this case, a playback task may start from any MXF file of any peer (1, . . . , n). Only Connection Metadata in the current MXF file need to be parsed, since it includes all reference messages about all concatenated MXF files from any one selected MXF file. Based on the reference messages from one MXF file in one peer, the stream-able playback task in the system can be set up.

Multiple Tasks Supported by Connection Metadata Packages

As shown in FIG. 11, while recording or packing a stream into MXF files, it is allowed to create different Connection Metadata Packages in the Header Metadata. Connection Metadata in different packages are distinguished with their Task ID. Different Connection Metadata Packages direct to different sequences of concatenated MXF files. This design may be useful in the following scenarios:

While recording a stream into an MXF file of a peer, before the peer reaches its maximum storage capacity, it will ask other peers if they can continue to record the input stream. If more than one peer can do it, and the current network capacity permits to do synchronized stream recording, and the task manager would like to do so, the current peer will generate multiple Connection Metadata packages. Connection Metadata in the same package will have the same Task ID, which represents a sequence of concatenated MXF files. Different packages direct to different sequences of MXF files. In this application, multiple sequences of concatenated MXF files are generated.

When a stream is split recorded into concatenated MXF files, sometimes the user would like to duplicate some MXF files for making safe copies. A duplicated MXF file may stay in the same or different peer from its origin. In this case, the system should generate separated Connection Metadata Package(s) in associated Header Metadata of all related MXF file(s). Based on such alternative Connection Metadata Package(s), it is possible to repair defect files and arrange optimal playback.

The invention is usable for all kinds of stream recording devices that can be used in distributed storage networks, particularly audio and/or video stream recorders in decentralized networks, such as peer-to-peer networks.

The invention claimed is:

1. A method for controlling a recording of a multimedia data stream on a distributed storage system using peer-to-peer technology, said method comprising steps of:
    packing first data of said multimedia data stream into a first material exchange format (MXF) file;
    transmitting the first MXF file to a first storage medium location on a first peer for recording;
    detecting that a storage capacity of the first storage medium location will be reached;
    in response to said detection, packing subsequent second data of said multimedia data stream into a second MXF file;
    transmitting the second MXF file to a different second storage medium location on a second peer different from the first peer for recording;
    duplicating said second MXF file to obtain a duplicated MXF file;
    inserting first connection data into said first MXF file, said first connection data pointing to said second MXF file;
    inserting second connection data into said second MXF file, said second connection data pointing to said first MXF file; and
    inserting third connection data into at least said first MXF file, said third connection data pointing to said duplicated MXF file, wherein the duplicated MXF file is an alternative for said second MXF file, and further wherein said first, second and third connection data each includes task data, attribute data and reference data, said task data contains a task ID value, said attribute data contains a status value comprising at least one of: "next" and "previous", and said reference data contains an ID value of another MXF file.

2. The method according to claim 1, wherein said multimedia data stream is split into a plurality of MXF files, and further including a step of inserting fourth connection data into said first MXF file, wherein the fourth connection data points to one or more MXF files of said multimedia data stream that precede said first MXF file.

3. The method according to claim 2, wherein the fourth connection data is ordered according to a creation order of said preceding MXF files.

4. The method according to claim 1, wherein said steps of inserting said first, second and third connection data are performed while terminating said recording of a respective MXF file.

5. The method according to claim 1, wherein said first, second and third connection data are inserted into at least one of header data and footer data of an MXF file.

6. The method according to claim 1, wherein said multimedia data stream is split into a plurality of MXF files, and further including a step of inserting fourth connection data into each of said plurality of MXF files, wherein the fourth connection data of any particular MXF file points to each MXF file of said multimedia data stream that precedes said particular MXF file.

7. The method according to claim 6, wherein the fourth connection data of any particular MXF file also points to each MXF file of said multimedia data stream that follows said particular MXF file.

8. The method according to claim 1, wherein said duplicated MXF file is stored at a storage location on said second peer.

9. The method according to claim 1, wherein said duplicated MXF file is stored at a storage location on a peer other than said second peer.

10. A device for controlling a recording of a multimedia data stream on a distributed storage system using peer-to-peer technology, said device comprising:
    means for packing first data of said multimedia data stream into a first material exchange format (MXF) file;
    means for transmitting the first MXF file to a first storage medium location on a first peer for recording;
    means for packing subsequent second data of said multimedia data stream into a second MXF file in response to detecting that a storage capacity of the first storage medium location will be reached;
    means for transmitting the second MXF file to a different second storage medium location on a second peer different from the first peer for recording;
    means for duplicating said second MXF file to obtain a duplicated MXF file;
    means for inserting first connection data into said first MXF file, said first connection data pointing to said second MXF file;
    means for inserting second connection data into said second MXF file, said second connection data pointing to said first MXF file; and
    means for inserting third connection data into at least said first MXF file, said third connection data pointing to said duplicated MXF file, wherein the duplicated MXF file is an alternative for said second MXF file, and further wherein said first, second and third connection data each includes task data, attribute data and reference data, said task data contains a task ID value, said attribute data contains a status value comprising at least one of: "next" and "previous", and said reference data contains an ID value of another MXF file.

11. The device according to claim 10, wherein said packing means enables splitting of said data stream into a plurality of MXF files, and further including means for inserting fourth connection data into said first MXF files, wherein the fourth connection data for a given MXF file points to one or more MXF files of said multimedia data stream that precede said first MXF file.

12. The device according to claim 10, wherein said first, second and third connection data are inserted into at least one of header data and footer data of an MXF file.

13. The device according to claim 10, further comprising:
means for sending a message to other devices requesting continued recording of the multimedia data stream;
means for receiving an answer from at least one second device;
means for notifying the at least one second device for preparing the recording of the multimedia data stream; and
means for rerouting the second MXF file to the at least one second device.

* * * * *